(12) United States Patent
Güner et al.

(10) Patent No.: US 9,172,121 B2
(45) Date of Patent: Oct. 27, 2015

(54) METHOD AND DEVICE FOR DETERMINING THE AGEING OF A BATTERY

(75) Inventors: Nevzat Güner, Berlin (DE); Swen Wiethoff, Berlin (DE); Knut Welke, Falkensee (DE); Sönke Gürtler, Berlin (DE); Rogelio Villarroel, Berlin (DE); Martin Voss, Schöneiche (DE); Reinhard Kassen, Berlin (DE); Reinhard Ganghofner, Nürnberg (DE); Michael Keller, Berlin (DE); Peter Birke, Glienicke/Nordbahn (DE); Axel Rudorff, Berlin (DE)

(73) Assignee: Temic Automotive Electric Motors GmbH, Berlin (DE)

( * ) Notice: Subject to any disclaimer, the term of this patent is extended or adjusted under 35 U.S.C. 154(b) by 864 days.

(21) Appl. No.: 12/097,079

(22) PCT Filed: Aug. 23, 2006

(86) PCT No.: PCT/DE2006/001486
§ 371 (c)(1),
(2), (4) Date: Jun. 25, 2012

(87) PCT Pub. No.: WO2007/068223
PCT Pub. Date: Jun. 21, 2007

(65) Prior Publication Data
US 2013/0196198 A1    Aug. 1, 2013

(30) Foreign Application Priority Data
Dec. 12, 2005 (DE) .......................... 10 2005 059 615

(51) Int. Cl.
*H01M 2/12* (2006.01)
*H01M 10/625* (2014.01)
(Continued)

(52) U.S. Cl.
CPC ........ *H01M 10/5016* (2013.01); *H01M 2/1016* (2013.01); *H01M 10/613* (2015.04);
(Continued)

(58) Field of Classification Search
CPC .......... H01M 2/1016; H01M 10/5004; H01M 10/5016; H01M 10/5075; H01M 10/5055; H01M 10/5059; H01M 10/503
USPC ........................................................... 429/83
See application file for complete search history.

(56) References Cited

U.S. PATENT DOCUMENTS

| | | | | |
|---|---|---|---|---|
| 5,418,083 A | * | 5/1995 | Tamaki et al. | 429/53 |
| 2005/0170240 A1 | * | 8/2005 | German et al. | 429/120 |
| 2006/0216582 A1 | * | 9/2006 | Lee et al. | 429/120 |

*Primary Examiner* — Gary Harris

(57) ABSTRACT

The invention relates to a battery holder (1) for galvanic cells, in which a first honeycomb structure (2.1 to 2.n), comprising a lower and an upper basic cooling body (3.1, 3.2) and at least one intermediate cooling body (4), is provided, wherein in each case, galvanic cells can be arranged on a cell level (5.1 to 5.n) in each case between one of the basic cooling bodies (3.1, 3.2) and one of the intermediate cooling bodies (4) and/or between two of the intermediate cooling bodies (4), wherein the galvanic cells of one of the cell levels (5.1 to 5.n) are displaced to the side to the galvanic cells of at least one adjacent cell level (5.1 to 5.n) by half the width of a galvanic cell, and wherein the intermediate cooling body (4) and the basic cooling bodies (3.1, 3.2) are formed in an area between the galvanic cells according to the outer contours of the galvanic cells, and wherein each of the cooling bodies (3.1, 3.2, 4) comprises at least on one end which lies in an axial direction to the galvanic cells a cooling chamber (8), through which a cooling medium (K) can flow, into which the cooling medium (K) can flow from at least one cooling chamber (K) of at least one adjacent cooling body (3.1, 3.2, 4) and/or from which the cooling medium (K) can flow out into at least one cooling chamber (8) of at least one of the adjacent cooling bodies (3.1, 3.2, 4), wherein at least one cooling chamber (8) of at least one of the cooling bodies (3.1, 3.2, 4) comprises a cooling agent inflow (6) and/or a cooling agent outflow (7).

9 Claims, 1 Drawing Sheet

(51) Int. Cl.
  *H01M 2/10* (2006.01)
  *H01M 10/6557* (2014.01)
  *H01M 10/6567* (2014.01)
  *H01M 10/6555* (2014.01)
  *H01M 10/643* (2014.01)
  *H01M 10/613* (2014.01)

(52) U.S. Cl.
  CPC .......... *H01M10/625* (2015.04); *H01M 10/643* (2015.04); *H01M 10/6555* (2015.04); *H01M 10/6557* (2015.04); *H01M 10/6567* (2015.04)

METHOD AND DEVICE FOR DETERMINING THE AGEING OF A BATTERY

BACKGROUND OF THE INVENTION

The invention relates to a battery holder with integrated cooling, in particular for the retention of cylindrical galvanic cells as are used in hybrid vehicles.

Electric and hybrid vehicles require powerful energy storage units in the form of galvanic cells for electrically driving the vehicles. For this purpose, lithium ion accumulators have become established, since they combine the advantages of a high energy density and a low memory effect. Due to the high temperatures which can on the one hand occur in the engine room of vehicles in particular, and on the other, are generated by the accumulators themselves as a result of high currents when the accumulators are being charged and discharged, it is necessary to actively cool the accumulators, since high temperatures can in part significantly reduce their working life.

The object of the invention is therefore to provide a battery holder with integrated, active cooling.

SUMMARY OF THE INVENTION

The object is attained according to the invention by means of a battery holder with the features described in claim 1.

Advantageous embodiments of the invention are the subject of the subclaims.

With a battery holder for galvanic cells according to the invention, at least one first honeycomb structure is provided. The honeycomb structure comprises a lower basic cooling body and an upper basic cooling body and at least one intermediate cooling body. Between one basic cooling body and one intermediate cooling body respectively, galvanic cells are arranged adjacent to each other at a cell level. The galvanic cells of one of the cell levels are displaced to the side of an adjacent cell level by half the width of a galvanic cell in such a manner that a honeycomb type arrangement of the galvanic cells results. With the preferred cylindrical galvanic cells, half the width of a galvanic cell corresponds to the radius of the galvanic cell. With prismatic galvanic cells, this size depends on the alignment of the prism. The intermediate cooling body and the basic cooling body are formed in an area between the galvanic cells in accordance with the outer contours of the galvanic cells, thus forming with cylindrical galvanic cells for example between two galvanic cells of a cell level and one galvanic cell of an adjacent cell level in this area a body which is essentially bordered by three concave surfaces, wherein the radius of the concave surfaces corresponds to the radius of the galvanic cells, so that in the interest of good heat conduction, the most direct possible contact between the galvanic cells and the cooling bodies results. Each of the cooling bodies comprises a cooling chamber, at least on one end which lies in an axial direction of the galvanic cells, through which a cooling medium can flow. The cooling medium can flow into the cooling chamber at least from one cooling chamber of at least one adjacent cooling body and/or from the cooling chamber, the cooling medium can flow out at least into one cooling chamber of at least one of the adjacent cooling bodies. At least one cooling chamber of at least one of the cooling bodies from at least one of the honeycomb structures comprises a cooling agent inflow and/or a cooling agent outflow for feeding and/or removing the cooling agent. In particular, fluids such as R134A or water can be used.

The advantages attained with the invention are in particular that a battery holder of this type can be extended modularly, i.e. it can be adapted to a required number of galvanic cells. The galvanic cells can be integrated in a simple manner in levels, for example by arranging a first layer of galvanic cells on a cell level on the lower basic cooling body, then an intermediate cooling body and a further layer of galvanic cells, if appropriate followed by further intermediate cooling bodies and layers of galvanic cells through to the upper basic cooling body. The battery holder thus formed can in a simple manner be tensioned in a radial direction of the galvanic cells, for example using webbing, or it can be sealed with a suitable sealing compound. In a battery holder of this type, defective galvanic cells can be easily replaced. The space saving, honeycomb arrangement of the galvanic cells is also of advantage. Due to the arrangement of cooling chambers on the cooling bodies, a direct heat transfer results and thus particularly efficient cooling is achieved. Between a basic cooling body and an intermediate cooling body, in particular at least to galvanic cells and between two intermediate cooling bodies in particular at least three galvanic cells can be arranged.

In a preferred embodiment, at least two honeycomb structures are arranged one behind the other in such a manner that each of the cooling chambers of at least one of the honeycomb structures borders on at least one of the other honeycomb structures. In particular, two honeycomb structures are arranged one behind the other, wherein their cooling chambers border on each other. This is particularly advantageous when the cooling medium can flow between at least one of the cooling chambers of at least one of the honeycomb structures and between the adjacent cooling chamber of the adjacent honeycomb structure, so that only one shared cooling agent inflow and one shared cooling agent outflow are required. This is achieved for example by means of the fact that the cooling chambers are open at a contact surface between the honeycomb structures, so that the cooling medium can easily flow between the cooling chambers of both honeycomb structures.

Preferably, here one of the cooling chambers respectively of one honeycomb structure is connected with the adjacent cooling chamber of the adjacent honeycomb structure in a fixed manner and is sealed in respect of the cooling medium, for example by means of a joining method such as soldering, welding or gluing.

In a preferred embodiment, the cooling chambers can in each case be connected to two adjacent cooling bodies in a honeycomb structure with connecting tubes, so that the cooling bodies can be put together in a simple manner, and are thus secured against slipping in the axial direction of the galvanic cells, and a simple option of allowing the cooling medium to flow between the adjacent cooling chambers in a honeycomb structure is created.

Preferably, at least one of the connecting tubes is sealed on to each of the cooling chambers which are connected by it by means of a seal in each case. Alternatively, the connecting tube can also be firmly connected with one of the cooling chambers, and only be sealed with the adjacent cooling chamber in the honeycomb structure by means of a seal.

Galvanic cells, in particular for high current applications, usually comprise at least at one of their ends a burst disc, which enables gases to escape when overheating or other extreme operating situations occur, in order to avoid an explosion of the galvanic cells. These gases must be removed from the battery holder via the fastest route possible, in order to prevent them collecting locally and thus forming explosive mixtures. In a preferred embodiment, for this reason, at least one of the connecting tubes is designed in such a manner that a specified minimum distance between the cooling bodies of the cooling chambers which are connected by it results with a specified gap in order to allow the gases to escape. This can for example be achieved over the length of the connecting tubes. Alternatively, a collar can be provided on the connecting tubes which acts as a type of stop.

Preferably, each of the cooling chambers is formed in such a manner that the cooling medium can flow within at least one of the honeycomb structures in only one circuit from the cooling agent inflow to the cooling agent outflow. This ensures that the cooling medium evenly flows through and cools all cooling bodies. Otherwise, the cooling medium flows through one flow path in particular with the least drop in pressure as a result of friction, flow cross-sections, the length of the path etc., so that the cooling chambers and thus the cooling bodies and the galvanic cells which are cooled by them are less cooled in the area of other flow paths.

In a preferred embodiment, the cooling bodies are formed from aluminium. Aluminium has a particularly good level of heat conductance, and is light and corrosion-proof.

In order to prevent the galvanic cells from slipping out in the axial direction from the battery holder, the cooling bodies are preferably fitted on one end opposite the cooling chamber with a stop angle.

Exemplary embodiments of the invention will now be described in greater detail below with reference to a drawing, in which.

Parts which correspond to each other are designated the same reference numerals in all figures.

Figure 1:
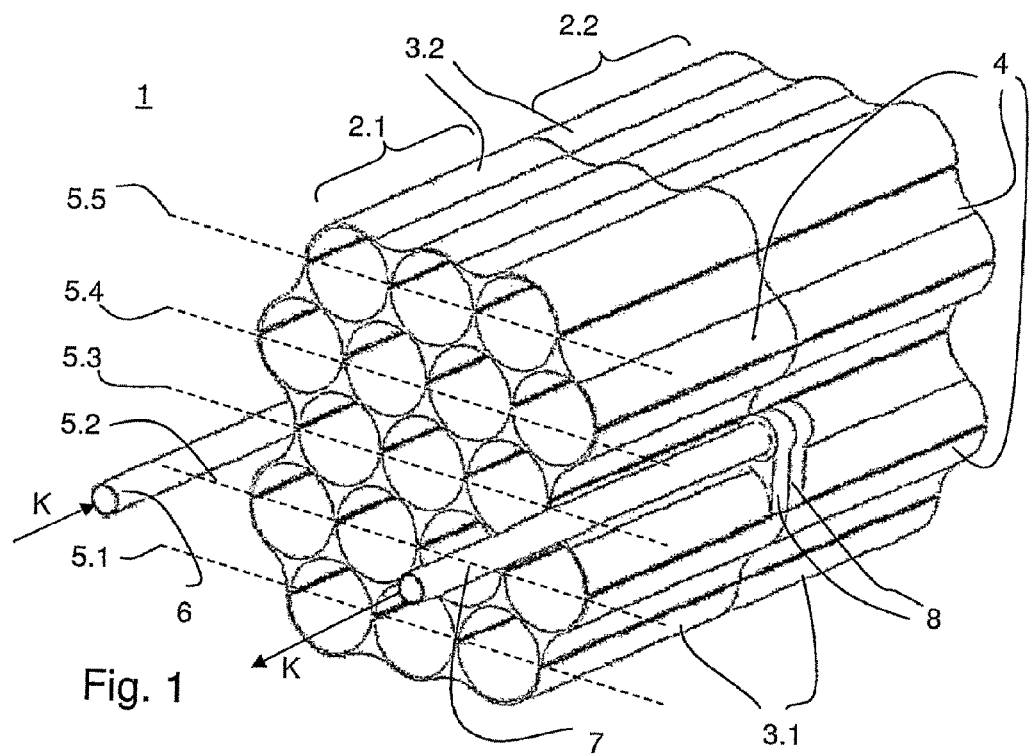
FIG. 1 shows a battery holder for retaining 34 cylindrical galvanic cells

FIG. 1 shows a battery holder 1 for retaining 34 cylindrical galvanic cells (not shown). The battery holder is formed from two honeycomb structures 2.1, 2.2 which are arranged one behind the other. Each of the honeycomb structures 2.1, 2.2 comprises a lower basic cooling body 3.1 and an upper basic cooling body 3.2 and four intermediate cooling bodies 4 which are arranged between them. All cooling bodies 3.1, 3.2, 4 are formed from aluminium. Between each of the cooling bodies 3.1, 3.2 and the adjacent intermediate cooling body 4 in each case, three galvanic cells respectively can be arranged on a cell level 5.1, 5.5. Between this and the next intermediate cooling body 4 in each case, four galvanic cells can be arranged on one further cell level 5.2, 5.4 respectively. Between the two middle intermediate cooling bodies 4, three galvanic cells can again be arranged on a cell level 5.3. The galvanic cells of the cell levels $5.n*2$ are displaced to the side to the galvanic cells of each adjacent cell level $5.n*2-1$ by half the width of a galvanic cell, i.e. by its radius, in such a manner that a honeycomb arrangement of the galvanic cells results. The intermediate cooling bodies 4 and the basic cooling bodies 3.1, 3.2 are formed in an area between the galvanic cells according to the outer contours of the galvanic cells, thus forming in this area a body which is essentially bordered by three concave surfaces, wherein the radius of the concave surfaces corresponds to the radius of the galvanic cells. The two honeycomb structures 2.1, 2.2 border each other. Each of the cooling bodies 3.1, 3.2, 4 of each of the honeycomb structures 2.1, 2.2 comprises on one end on which it borders a cooling body 3.1, 3.2, 4 of the other respective honeycomb structure 2.2, 2.1 a cooling chamber 8, which is more clearly shown in FIGS. 2 and 3. A cooling medium K can flow through the cooling chambers 8, which is fed to one of the cooling chambers 8 via a cooling agent inflow 6 and which is removed again from the same or another cooling chamber 8 via a cooling agent outflow 7. As a cooling medium K, water or R134A can be used, for example. Other cooling mediums K are equally suitable.

Figure 2:
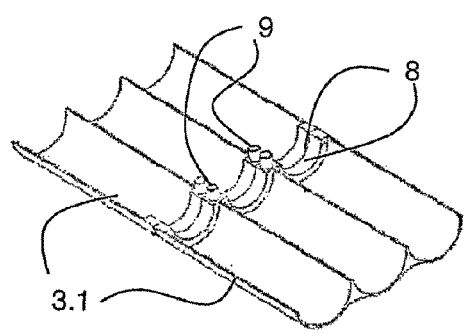
FIG. 2 shows two basic cooling bodies which are connected to their cooling chambers.

FIG. 2 shows two lower basic cooling bodies 3.1 of two honeycomb structures 2.1, 2.2, which are connected with each other on their cooling chambers 8. The cooling chamber 8 of one of the basic cooling bodies 3.1 is designed so that it is open to the cooling chamber 8 of the other basic cooling body 3.1 respectively so that the cooling medium K can flow freely between them. The cooling chambers 8 are firmly connected with each other by means of a joining method such as soldering, welding or gluing, and are sealed with respect to the cooling medium K. The cooling chambers 8 comprise on their side which faces an adjacent cooling chamber 8 of an intermediate cooling body 4 (not shown) within the respective honeycomb structure 2.1, 2.2 connecting tubes 9 through which the cooling medium K can flow into this adjacent cooling chamber 8 or can flow out of it. Each of the connecting tubes 9 is sealed to each of the cooling chambers 8 which are connected by it by means of a seal in each case (not shown).

FIG. 2 can in essence also be applied to the upper basic cooling body 3.2.

Figure 3:
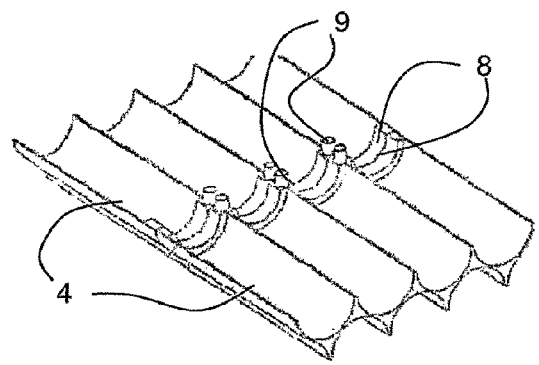
FIG. 3 shows two intermediate cooling bodies which are connected to their cooling chambers.

FIG. 3 shows two intermediate cooling bodies 4 of two honeycomb structures 2.1, 2.2 which are connected with each other on their cooling chambers 8. The cooling chamber 8 of one of the intermediate cooling bodies is designed so that it is open to the cooling chamber 8 of the other intermediate cooling body 4 respectively, so that the cooling medium K can flow freely between them. The cooling chambers 8 are firmly connected with each other by means of a joining method such as soldering, welding or gluing, and are sealed with respect to the cooling medium K. The cooling chambers 8 comprise on their side which faces an adjacent cooling chamber 8 of an intermediate cooling body 4 (not shown) within the respective honeycomb structure 2.1, 2.2 connecting tubes 9 through which the cooling medium K can flow into this adjacent cooling chamber 8 or can flow out of it. Each of the connecting tubes 9 is sealed to each of the cooling chambers 8 which are connected by it by means of a seal in each case (not shown).

The connecting tubes 9 can be designed in such a manner that a specified minimum distance results between the cooling bodies 3.1, 3.2, 4 of the cooling chambers 8 which are connected by it with a specified gap to allow gases to escape. This can for example be achieved via the length of the connecting tubes. Alternatively, a collar can be provided on the connecting tubes which acts as a type of stop.

Each of the cooling chambers 8 can be formed in such a manner that the cooling medium K can flow within at least one of the honeycomb structures 2.1, 2.2 in only one circuit from the cooling agent inflow 6 to the cooling agent outflow 7.

A different number of honeycomb structures 2.1 to $2.n$ can be provided which are arranged behind and/or next to each other.

The basic cooling bodies 3.1, 3.2 and/or the intermediate cooling bodies 4 can be formed in such a manner that a different number of galvanic cells can be retained between the cooling bodies 3.1, 3.2, 4.

The number of intermediate cooling bodies 4 can be selected differently.

Both ends of the cooling bodies 3.1, 3.2, 4 can be provided with cooling chambers 8.

In each case, more than on cooling agent inflow and cooling agent outflow, in particular to the cooling chambers 8 of different cooling bodies 3.1, 3.2, 4, can be provided.

Alternatively, the connecting tube 9 can also be firmly connected with one of the cooling chambers 8 and only be sealed by means of a seal to the adjacent cooling chamber 8 in the honeycomb structure 2.1, 2.2.

The cooling bodies 3.1, 3.2, 4 can be formed from a different material.

The cooling bodies 3.1, 3.2, 4 can be provided on one end which is opposite the cooling chamber 8 with a stop angle, in order to prevent the galvanic cells from slipping out in the axial direction.

The invention claimed is:

1. A battery holder for galvanic cells, in which at least a first honeycomb structure, comprising a lower basic cooling body and an upper basic cooling body and at least one intermediate cooling body, is provided, wherein a plurality of galvanic cells can be arranged on a plurality of cell levels between the cooling bodies, wherein a first cell level of the plurality of cell levels is displaced to the side of a second cell level of the plurality of cell levels by half the width of a galvanic cell of the plurality of galvanic cells in such a manner that a honeycomb-like arrangement of the plurality of galvanic cells results, and wherein the at least one intermediate cooling body and the basic cooling bodies are formed in an area between the galvanic cells of the plurality of galvanic cells according to outer contours of the galvanic cells, and wherein each of the cooling bodies comprises a cooling chamber that extends into the first honeycomb structure in an axial direction of the galvanic cells, through which a cooling medium can flow, each cooling chamber being disposed adjacent to another cooling chamber of the cooling bodies, wherein the cooling medium can flow from at least one cooling chamber to an adjacent cooling chamber, wherein at least one cooling chamber of at least one of the cooling bodies comprises a cooling agent inflow for feeding the cooling mediuem, and at least one cooling chamber comprises a cooling agent outflow for removing the cooling medium.

2. A battery holder according to claim 1, further comprising a second honeycomb structure comprising a lower cooling body, an upper cooling body, and at least one intermediate cooling body, each cooling body comprising a cooling chamber, characterized in that the first honeycomb structure and the second honeycomb structure are arranged one behind the other in such a manner that each of the cooling chambers of the first honeycomb structure borders on a cooling chamber of the second honeycomb structure.

3. A battery holder according to claim 2, characterized in that the cooling medium can flow between at least one of the cooling chambers of the first honeycomb structure and at least one cooling chamber of the second honeycomb structure.

4. A battery holder (1) according to claim 3, a cooling chamber of the first honeycomb structure being connected with a cooling chamber of the second honeycomb structure, and sealed with respect to the cooling medium.

5. A battery holder according to claim 4, further comprising a plurality of connecting tubes connecting the cooling chambers of the intermediate cooling body with the cooling chambers the upper basic cooling body and the lower basic cooling body.

6. A battery holder according to claim 5, further comprising a seal connecting at least one of the connecting tubes to two of the cooling chambers, the seal being configured to seal the two cooling chambers together.

7. A battery holder according to any claim 6, characterized in that at least one of the connecting tubes is designed in such a manner that a specified minimum distance between the cooling bodies of the cooling chambers connected by the at least one connecting tube results with a specified gap to allow gases to escape.

8. A battery holder according to claim 7, characterized in that each of the cooling chambers is formed in such a manner that the cooling medium can flow within the first honeycomb structure in only one circuit from the cooling agent inflow to the cooling agent outflow.

9. A battery holder according to any one of the preceding claims, characterized in that the cooling bodies are formed from aluminum.

* * * * *